(12) United States Patent
Mazzini et al.

(10) Patent No.: US 11,922,979 B2
(45) Date of Patent: Mar. 5, 2024

(54) CIRCUIT FOR CONTROLLING A RESISTIVE CIRCUIT

(71) Applicant: STMicroelectronics S.r.l., Agrate Brianza (IT)

(72) Inventors: Marco Mazzini, Pavia (IT); Marco Ciuffolini, Pieve Emanuele (IT); Enrico Mammei, Vittuone (IT); Paolo Pulici, Lainate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/146,034

(22) Filed: Dec. 23, 2022

(65) Prior Publication Data

US 2023/0245676 A1 Aug. 3, 2023

(30) Foreign Application Priority Data

Feb. 3, 2022 (IT) .................. 102022000001877

(51) Int. Cl.
| | | |
|---|---|---|
| *G11B 5/02* | (2006.01) | |
| *G05F 1/56* | (2006.01) | |
| *G11B 5/012* | (2006.01) | |
| *H05B 3/22* | (2006.01) | |
| *G11B 5/00* | (2006.01) | |

(52) U.S. Cl.
CPC .............. *G11B 5/012* (2013.01); *G05F 1/56* (2013.01); *H05B 3/22* (2013.01); *G11B 2005/0021* (2013.01)

(58) Field of Classification Search
CPC ................ G11B 20/0013; G11B 11/10; G11B 2005/0021; G11B 5/035; G11B 20/10046; G11B 2005/0018; G11B 5/02; G11B 20/10027; G11C 27/024; H03H 2210/025; G06G 7/186
USPC .......................................................... 360/59
See application file for complete search history.

(56) References Cited

U.S. PATENT DOCUMENTS

| | | | |
|---|---|---|---|
| 7,130,141 B2 | 10/2006 | Chey et al. | |
| 7,375,912 B2 | 5/2008 | Brannon et al. | |
| 8,830,618 B2 | 9/2014 | Li et al. | |
| 9,390,741 B2 * | 7/2016 | Johnson | ............... G11B 5/3133 |
| 2017/0110964 A1 | 4/2017 | Ham | |

FOREIGN PATENT DOCUMENTS

CN 1324607 C 7/2007

* cited by examiner

*Primary Examiner* — Nabil Z Hindi
(74) *Attorney, Agent, or Firm* — Slater Matsil, LLP

(57) ABSTRACT

In accordance with an embodiment, a circuit is configured to vary an intensity of a drive current of a resistive heater element based on the digital control signal. The circuit includes and output circuit configured to control a respective slew rate and an electric energy dissipated in the resistive heater element independently of a resistance value of the resistive heater element.

20 Claims, 5 Drawing Sheets

CIRCUIT FOR CONTROLLING A RESISTIVE CIRCUIT

CROSS-REFERENCE TO RELATED APPLICATIONS

This application claims the benefit of Italian Patent Application No. 102022000001877, filed on Feb. 3, 2022, which application is hereby incorporated herein by reference.

TECHNICAL FIELD

The description relates to generally to electronic circuits and more particularly to a circuit for controlling a resistive circuit.

BACKGROUND

A hard-disk drive (HDD) is a known kind of data storage device that provides memory space for processing systems. Data is read from/written to tracks in the disks via a read/write (R/W) head mounted on a positioning arm that is controlled to move it across the surface of the storage disk as this is spun at high speed via a spindle.

As the operating temperature of the HDD changes, it is desirable to keep the spacing between the R/W head and the storage disk surface (also referred to as "fly-height") as constant as possible to achieve accurate writing and reading of data to and from the storage disk. To this end, a conventional HDD R/W head comprises a resistive heating element, e.g., mounted near a pole tip of the head.

Fly-height control circuitry (FHCC) can be configured to dissipate electrical energy/power into the resistive element so that a clearance distance between the R/W head and the disk surface can be controlled as a function of thermal expansion of the electromagnet poles. For instance, the heat due to power dissipation causes thermal expansion of the pole, so that a tip of the R/W head protrudes towards the disk surface as a result. Such an arrangement is known, for instance, in U.S. Pat. No. 8,830,618 B2.

Increasing fly-height clearance may counter the risk of collisions of the head with irregularities located on the disk surface, for instance, while also affecting the performance of HDDs, e.g., in terms of decreased signal-to-noise ratio (SNR).

FHCC can be integrated in a pre-amplifier circuit of the HDD, so that the area of a control circuitry affects the overall chip area. In this scenario, in order to counter electromagnetic coupling between FHCC and other pre-amplifier circuit blocks, such as the low noise amplifier, for instance, slew-rate control may be introduced, increasing circuit complexity.

Existing solutions may employ a programmable DAC to provide current to a reference resistor RIV coupled to an input node of an operational amplifier configured to provide an output signal with a slew-rate equal to that of the voltage at its input node. This solution presents the drawback that the op-amp can have a latency in producing an output voltage as steep as the input reference. For instance, during a start-up phase of the amplifier, some of its internal nodes may be biased to their target level with a significant latency when the input voltage rises from 0V. Thus, proper functioning of these solutions is limited to cases in which the op-amp is fully biased and has an adequately wide bandwidth.

Thus, there is an increasing demand for improved FHCC in HDDs to finely regulate power on the heater resistance and to control fly-height with high precision (e.g., in the range of few nanometers).

It is noted that issues as discussed in the foregoing may arise in a variety of devices (e.g., regulating devices configured to provide an electric power to an electric load at a regulated level unaffected by fluctuations in impedance of the load, lighting devices, monitoring devices configured to control power consumption based on a detected current/voltage level monitored at an electric load).

SUMMARY

One or more embodiments relate to a corresponding memory storage device.

A hard-disk drive (HDD) may be exemplary of such a memory storage device.

One or more embodiments facilitate providing an accurate energy/power control and a controlled slew rate with reduced circuit complexity.

One or more embodiments provide a possibility to manage more channels within a single pre-amplifier stage.

One or more embodiments provide a solution that is robust against non-idealities of the amplifier stage (such as unbalanced biasing conditions at start-up, for instance). For instance, this facilitates countering spikes in the amplifier slew-rate.

One or more embodiments facilitate reducing circuit complexity, e.g., dispensing from using a dedicated stage that fixes the desired slew-rate for the op-amp.

One or more embodiments facilitate reducing electromagnetic coupling between other circuit traces/pads.

One or more embodiments facilitate an improved control of a slew rate in the output voltage.

In one or more embodiments, an output stage is equipped with embedded slew-rate control, e.g., thanks to an operational amplifier having a programmable tail current and a Miller capacitor to couple the amplifier to the heater output node.

One or more embodiments facilitate instant control of slew rate of the signal output of the amplifier, e.g., even during "start-up" sequence in which the heater is turned on. For instance, the slew-rate can be controlled almost immediately after the heater is turned on, e.g., without waiting for a settling-time.

In one or more embodiments, slew-rate may be trimmed precisely, according with process corners, e.g., by fine-tuning a programmable tail current of the amplifier stage to drive the output stage of the heater.

One or more embodiments facilitate efficient identification of anomalous load conditions like "short" or "open" or "out-of-spec" of external load value. For instance, this can be done by providing to the amplifier stage a target voltage that is directly correlated with voltage applied on the pad.

In one or more embodiments, a total output power (that is, energy over time) is regulated using separate feedback loops for current and voltage applied to the external load, e.g., employing a trans-linear cell for processing thereof. For instance, this stage can be bypassed for testing purpose, when it may be sufficient to control the output voltage rather than the output power, for instance.

One or more embodiments facilitate increased circuit stability, e.g., thanks to a reduced number of components and, subsequently, of poles in the circuit transfer function.

As exemplified herein, power control comprises triggering a programmable tail current to flow directly in a resistive heater element in response to appreciable variations of energy over time applied thereto with respect to a target value.

It is again noted that, while discussed herein with attention paid primarily to hard disk drives (HDDs), the embodiments are applicable to a variety of devices such as, e.g., driver circuits configured to drive power ON/OFF of lighting devices, regulating devices configured to provide an electric energy/power to an electric load at a regulated level unaffected by fluctuations in impedance of the load, monitoring devices configured to control energy/power consumption based on a detected current/voltage level monitored at an electric load.

BRIEF DESCRIPTION OF THE DRAWINGS

One or more embodiments will now be described, by way of non-limiting example only, with reference to the annexed Figures, wherein.

Corresponding numerals and symbols in the different figures generally refer to corresponding pails unless otherwise indicated.

The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals unless the context indicates otherwise, and for brevity a corresponding description will not be repeated for each and every figure.

The references used herein are provided merely for convenience and hence do not define the extent of protection or the scope of the embodiments.

For the sake of simplicity, in the following detailed description a same reference symbol may be used to designate both a node/line in a circuit and a signal that may occur at that node or line.

In various embodiments, energy dissipated over time in resistive elements is controlled, for instance for/in data storage devices. One or more embodiments may be applied to control a read/write head of a data storage device, e.g., heating the head to maintain a fly-height or distance from a surface of the memory storage device. One or more embodiments may be applied to an amplifier stage of a hard-disk drive (HDD), for instance.

Figure 1:
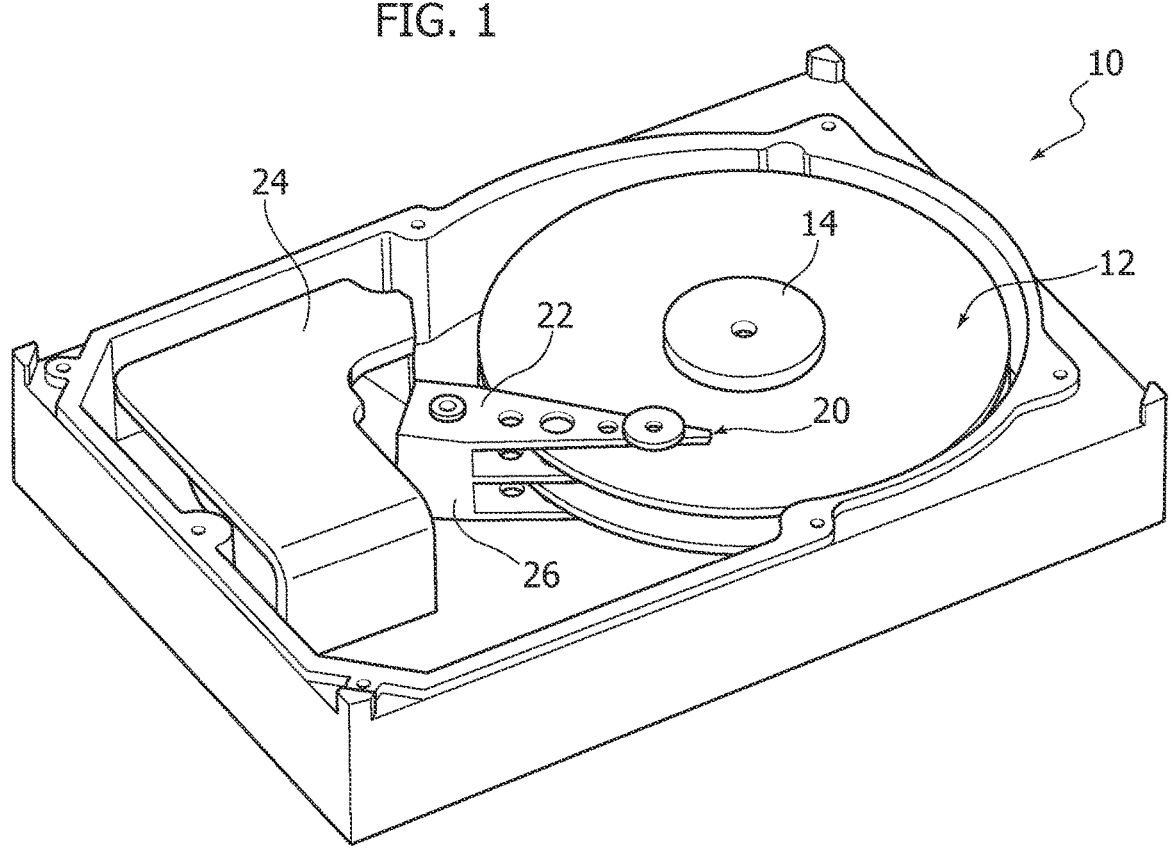
FIG. 1 shows a perspective view of an exemplary data storage device.

As exemplified in FIG. 1, a data storage device 10 such as a hard disk drive, for instance, includes: at least one data storage disk 12 having a storage surface capable of storing data in a manner known per se, a spindle 14 comprising a respective spindle motor, the spindle 14 coupled to the storage disk 12 and configured to perform high-speed spinning thereof in response of actuation by the motor (not visible in FIG. 1); a read/write head 20 mounted on a positioning arm 22 and configured to read data from/write data to the storage disk 12; and an actuator 24 coupled to one end 26 of the positioning arm 22 opposite the read/write head 20, the actuator 24 configured to controllably swing the read/write head 20 into a desired position across the surface of the storage disk 12 as this is spinning driven via the motor of the spindle 14.

Figure 2:
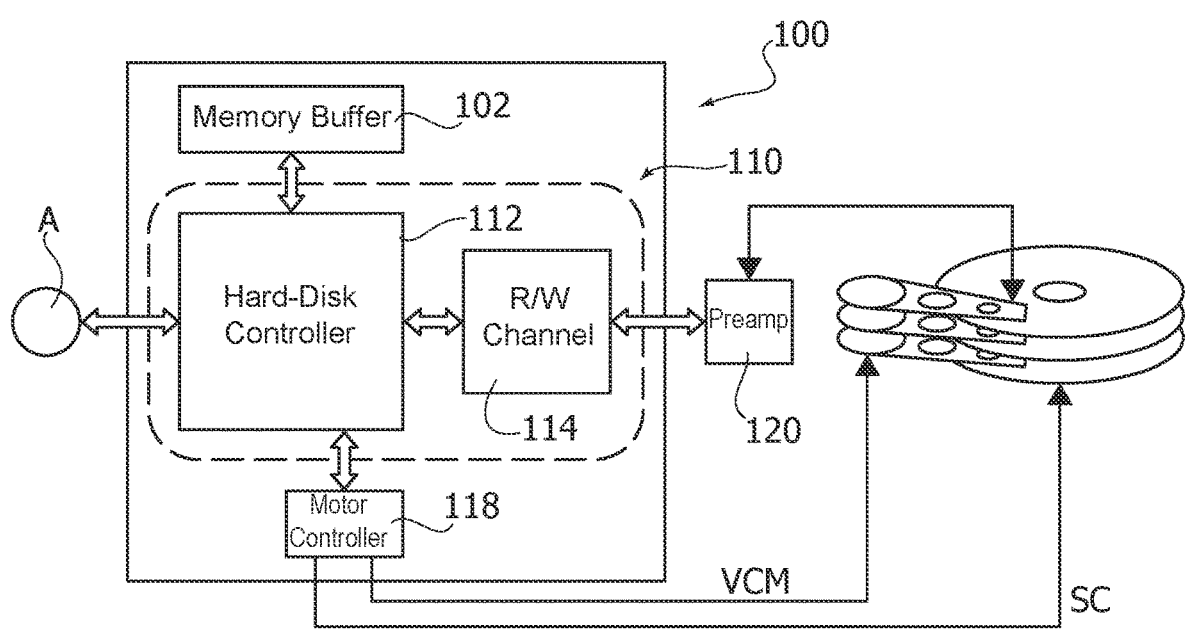
FIG. 2 is a diagram exemplary of control circuitry operating the data storage device exemplified in FIG. 1.

As exemplified in FIG. 2, the storage device 10 comprises one or more storage disks attached to the same spindle 14 such that each storage disk 12 rotates at the same speed, as well as one or more read/write heads 20 and associated positioning arms 22 coupled to one or more actuators 24.

As exemplified in FIG. 2, the storage device 10 further comprises control circuitry 100 (e.g., mounted on a housing of the HDD 10) configured to process data received from and supplied to the R/W head 20 and to control positioning of the read/write head 20 relative to the storage disk 12.

For instance, the control circuitry 100 comprises electronic components mounted on a printed-circuit board (PCB), such as: a memory buffer 102, e.g., SDRAM, configured to temporarily host data to be read from/written to the disk, a system-on-chip (SoC) 110 comprising a hard-disk controller (HDC) 112 configured to produce (e.g., voice coil motor and spindle) control signals VCM, SC for actuating the positioning arm 26 and the motor of the spindle 14, respectively; the SoC 110 further comprises at least one R/W channel 114 configured to transfer data to/from each R/W head 20 of each disk 12 of the HDD 10, a motor controller 118 coupled to the HDC 112 and configured to receive the control signals VCM, SC therefrom, the motor controller 118 further configured to provide the control signals VCM, SC to the positioning arm 26 and the motor of the spindle 14, respectively, driving their actuation, and pre-amplifier circuitry 120 (e.g., mounted on flexible printed-circuit board inside the HDD 10) providing an interface between the SOC 110 and the R/W heads 20 to process the data for reading from/writing to the disks 12.

For instance, the pre-amplifier 120 is configured to receive a digital control signal PHT (provided by the SoC 110, for instance) indicative of a desired value of energy dissipated over time (e.g., electrical power) in the resistive element RHT, e.g., onboard the R/W head(s) 20, as discussed in the following.

It is noted that the particular arrangement of elements shown in FIGS. 1 and 2 is presented by way of illustrative example only. Those skilled in the art will recognize that a wide variety of other storage device configurations may be used in implementing embodiments of the invention.

As exemplified herein, a memory storage device 10 (such as a hard-disk drive, HDD, for instance) includes: a read/write head 20 configured to have a spacing $\Delta d$ between the tip 200 and a storage medium surface 12 in the memory storage device 10; and a circuit as exemplified herein coupled to the read/write head 20, the circuit configured to control electrical energy VHT (e.g., power or voltage) dissipated in the resistive heater element RHT over time, wherein the spacing $\Delta d$ varies as a function of intensity of the drive current IHT provided to the resistive heater element RHT (e.g., the heater element RHT having a resistance ranging from tens to hundreds of Ohms and beyond).

Figure 3:
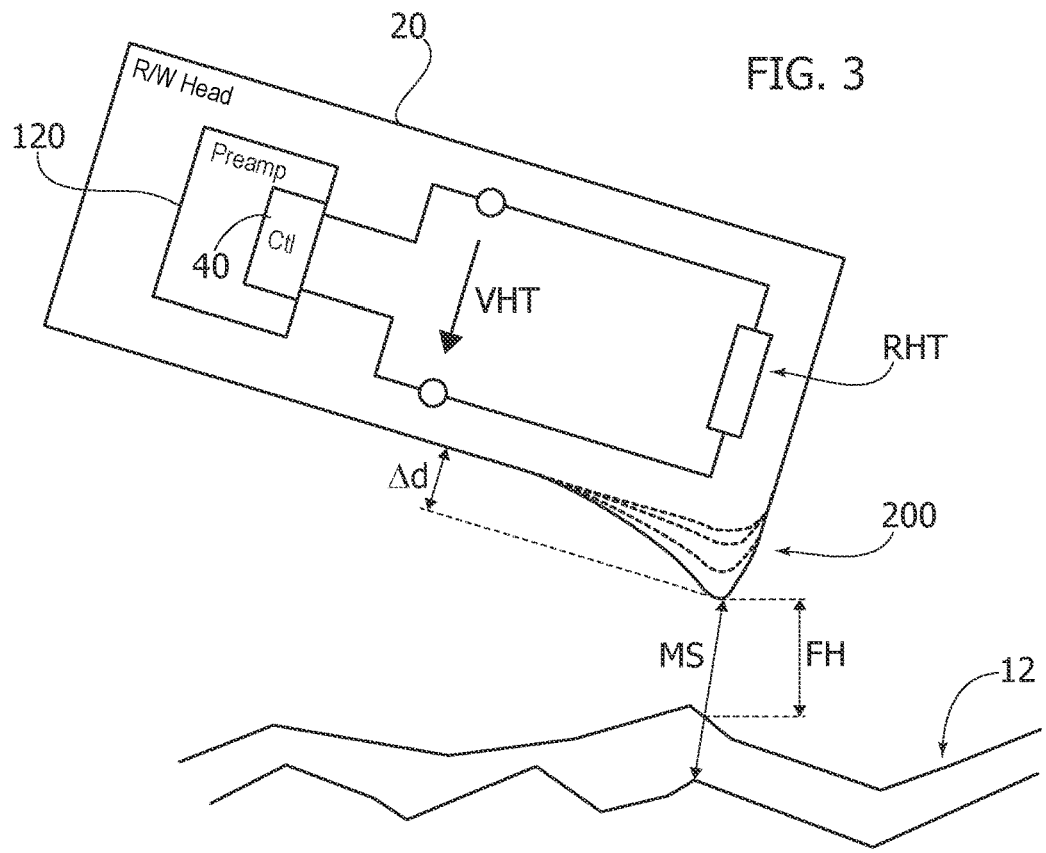
FIG. 3 is a diagram exemplary of principles underlying one or more embodiments.

As exemplified in FIG. 3, the R/W head 20 comprises various components (known per se) such as a write element and/or a read element and a heater circuit RHT. For instance, the heater circuit comprises a resistive element RHT (e.g., referred to ground GND) placed near the R/W head 20 to dissipate a controlled energy over time in proximity thereof.

As exemplified in FIG. 3, the surface of the storage disk 12 comprises a plurality of tracks for storing blocks of data in a magnetic layer below the surface of the disk 12. As exemplified in FIG. 3, such a surface may be non-planar, that is presenting peaks and valleys. For instance, the R/W head 20 comprises a tip 200 to read/write data blocks (in a manner per se known) that is driven to "hover" at a certain "fly-height" FH in order to counter the risk of collisions with track peaks and to facilitate reading magnetic tracks, e.g., by reducing magnetic spacing MS.

In order to vary the fly-height FH, the pre-amplifier circuitry 120 comprises fly-height control circuitry 40 configured to vary a voltage VHT (and/or current $I_{HT}$) signal provided to the resistive element RHT of the heater circuit.

As exemplified in FIG. 3, (e.g., increased) heat produced due to (e.g., increased) energy/power dissipation in the resistive element RHT of the heater causes thermal expansion of the tip 200 of the R/W head 20, e.g., so that the head 20 protrudes by an amount $\Delta d$ towards the disk 12. For instance, controlled actuation of the head 20 leads to setting a desirable fly-height FH in the range of few nanometers (1 nanometer=$10^{-9}$ m), e.g., in order to improve signal-to-noise ratio (SNR).

As exemplified herein, the resistive heater element RHT is configured to be thermally coupled to a tip 200 of a read/write head 20 in a memory storage device 10, the read/write head 20 configured to have a spacing $\Delta d$ between the tip 200 and a storage medium surface 12 in the memory storage device. For instance, the spacing $\Delta d$ varies as a function of the (electrical) energy dissipated in the resistive heater element RHT, wherein the energy dissipated varies as a function of intensity of the drive current IHT provided to the resistive heater element RHT.

Figure 4:
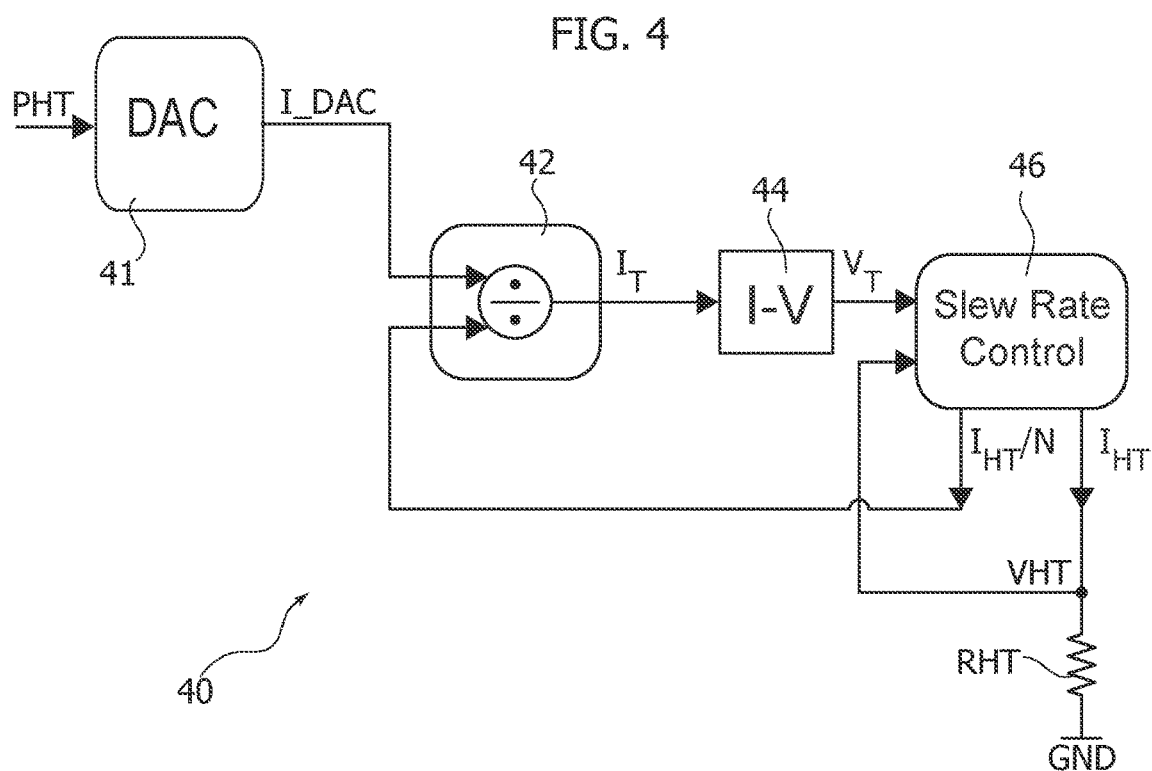
FIG. 4 is a block diagram exemplary of a fly-height control system as per the present disclosure.

FIG. 4 is a block diagram of a fly-height control system 40 according to the present disclosure.

For instance, the fly height control system 40 controls a level of electric energy applied over time to the resistive heater element RHT (e.g., via controlling applied levels of electric voltage/current) based on the control signal PHT received at an input node and produces an output current flow IHT to provide to the resistive heater element RHT referred to ground GND via an output node VHT coupled thereto.

As exemplified in FIG. 4, the fly-height control system 40 adjusts the output current $I_{HT}$ to control the energy/power applied to the resistive heater element RHT, thereby controllably adjusting the spacing between the read/write head 20 and a surface of the storage disk 12, as discussed above with reference to FIG. 3.

As exemplified in FIG. 4, the fly-height control circuitry 40 includes: a digital-to-analog converter (DAC) 41 configured to (e.g., finely) convert a digital control signal PHT (provided by the SoC 110, for instance) to an analog current having a target current intensity value I_DAC, the digital control signal PHT being indicative of a setpoint value of electrical power/energy dissipated across the resistive element RHT of the R/W head 20; a divider circuit block 42, such as a divider, for instance, the divider circuit 42 having an input node coupled to the DAC 41 to receive therefrom the analog current I_DAC; optionally, the divider 42 has a further input node coupled to a slew rate (SR) control stage 46 to receive therefrom a feedback (current) signal $I_{HT}/N$; as discussed in the following, the divider 42 is configured to provide as an output a target current (intensity) value $I_T$ based on the (intensity of the) target analog current I_DAC (preferably, based on a ratio of the analog current intensity I_DAC and the feedback current intensity $I_{HT}/N$); a current-to-voltage converter 44 coupled to the divider 42 to receive the target current value $I_T$ therefrom, the current-to-voltage converter 44 configured to apply current-to-voltage conversion to the target current value $I_T$, producing a target voltage (drop) value $V_T$ as a result; and a SR circuit block 46 having an input node coupled to the current-to-voltage converter 44 and an output node coupled to the heater resistive element RHT, the SR circuit block 46 configured to produce a (energy) voltage drop VHT across the resistive element RHT as a function of the target voltage value $V_T$.

As exemplified herein, the SR circuit block 46 is further configured to limit slew-rate of output voltage drop VHT, e.g., in order to limit interference between the heater circuit output and adjacent circuit blocks.

As known to those of skill in the art, the term "slew rate" refers to a rate of variation of voltage or current (or any other electrical quantity) per unit of time.

In one or more embodiments, the target voltage value $V_T$ provided to the SR stage 46 can have any slope (that is, any rate of variation in time) thanks to the slew-rate control being embedded in the same circuit block 46 that generates the voltage level VHT based on the target voltage value $V_T$.

As exemplified herein, a circuit includes: a resistive heater element RHT configured to produce heat based on an electric energy dissipated therein; a heater drive node VHT coupled to the resistive heater element to provide a drive current $I_{HT}$ thereto, wherein the energy dissipated in the resistive heater element RHT varies over time as a function of the intensity of the drive current provided to the resistive heater element; an input node configured to receive a digital control signal indicative of a target intensity of the drive current; and control circuitry 40 coupled to the input node and to the heater drive node, the control circuitry configured to vary the intensity of the drive current of the resistive heater element based on the digital control signal.

As exemplified herein, the control circuitry includes: a digital-to-analog converter, DAC, 41 coupled to the input node to receive the digital control signal therefrom, the DAC configured to produce, based on the digital control signal, an analog current I_DAC having an analog target intensity value of the drive current; driver circuitry 42, 44 coupled to the DAC to receive therefrom the analog target intensity of the drive current, the driver circuitry configured to produce an analog target voltage $V_T$; and an output circuit 46 coupled to the driver circuitry to receive therefrom the analog target voltage, the output circuit configured to produce the drive current provided to the resistive heater element based on the analog target voltage, wherein the driver circuitry is configured to produce the analog target voltage based on the analog target intensity from the DAC, and wherein the output circuit controls the energy dissipated in the resistive heater element independently of a resistance value of the resistive heater element.

For instance, the driver circuitry is configured to provide the drive current based on the analog target voltage $V_T$ with a respective slew rate dVHT/dt, wherein the output circuit controls the respective slew rate of the drive current independently of a resistance value of the resistive heater element.

As exemplified herein, the output circuit 46 is configured to produce: the drive current $I_{HT}$ based on the (variation of) analog target voltage $V_T$ from the driver circuitry 44; and a feedback current signal $I_{HT}/N$ indicative of the (intensity of the) drive current $I_{HT}$ produced by the output circuit.

Figure 5:
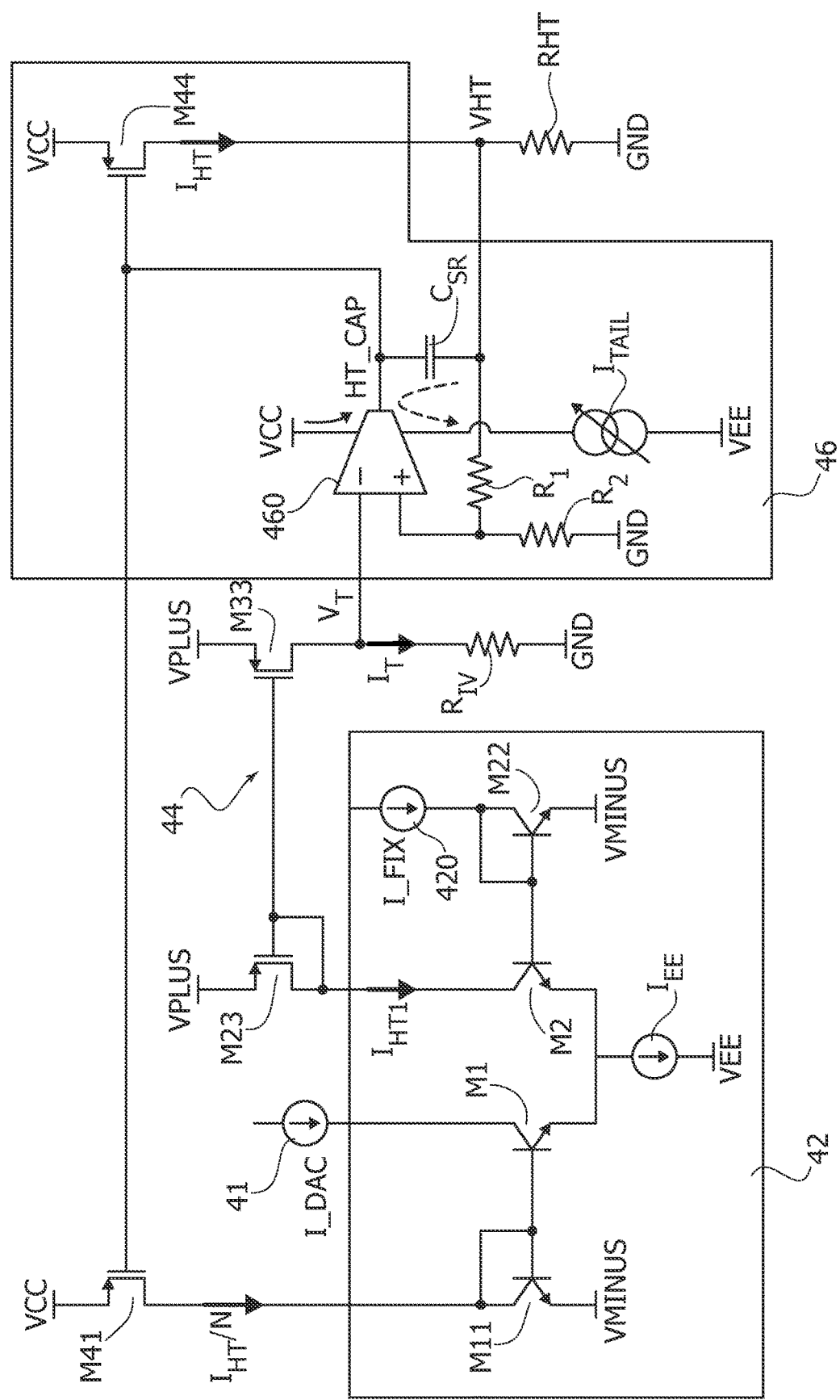
FIG. 5 is a circuit diagram exemplary of fly-height control circuitry as per the present disclosure.

As exemplified in FIGS. 4 and 5, the DAC circuit block 41 comprises a current generator 41 configured to produce a (e.g., finely tuned) target analog current I_DAC that has a current intensity value proportional (e.g., by a gain constant K0) to the input digital signal I_AN, e.g., to a decimal value of the digital code I_AN input to the DAC circuit 41.

As exemplified in FIG. 5, the driver circuitry comprises a trans-linear circuit M1, M2, M11, M22 configured to receive the analog target current value I_DAC from the DAC 41 and to apply a current $I_T$ having an intensity based on the analog target current intensity I_DAC to a reference resistor $R_{IV}$. For instance, the target analog voltage is equal to a voltage drop across the reference resistor $R_{IV}$.

As exemplified in FIG. 5, the divider circuit block 42 comprises (e.g., bi-polar or MOSFETs) transistors M1, M2, M11, M22 arranged (in a manner known per se) as a translinear cell, a first transistor M1 configured to receive the DAC current I_DAC, a second transistor M11 configured to receive the feedback current $I_{HT}/N$, a third transistor M22 configured to receive a compensation current I_FIX and a fourth transistor M2 configured to provide a current $I_{HT1}$ proportional (via a mirror factor, e.g., unitary in case transistors M23 and M33 have a same size) to the target current value $I_T$.

In an exemplary scenario, the target current intensity $I_T$ is obtained as a function of a ratio of the analog current intensity value I_DAC provided by the DAC 41 and the feedback current intensity value $I_{HT}/N$ provided by the SR circuit 46. For instance, the target current value $I_T$ is proportional to ratio of the analog current value I_DAC from the DAC 41 and the feedback current value $I_{HT}/N$ from the SR circuit 46, e.g., with a proportionality factor equal to the compensation current I_FIX, and it can be expressed as:

$$I_T = I\_DAC \cdot I\_FIX \cdot N / I_{HT},$$

where N is any integer indicative of which fraction 1/N of the current $I_{HT}$ flowing in the resistive element RHT is used as feedback signal $I_{HT}/N$.

As exemplified herein, SR circuit 46 is configured to produce the feedback signal $I_{HT}/N$, where integer N selectable to balance frequency domain behavior, precision and consumption of the circuit 46. For instance, increasing values of integer N (e.g., varying the area footprint of transistor M41, as discussed in the following), facilitates reducing consumption and area.

As exemplified herein, the (intensity of the) feedback current $I_{HT}/N$ is a fraction or down-scaled replica of the (intensity of the) current flowing in the resistive heater element RHT, preferably down-scaled by an integer scale factor N.

As exemplified in FIG. 5, the current-to-voltage converter 44 comprises a current mirror arrangement of a first transistor M23 and a second transistor M33 having respective (e.g., source) first transistor nodes coupled to a common supply voltage level VPLUS and respective (e.g., gate) control nodes coupled therebetween. For instance, the first transistor M23 in the converter 44 has a third (e.g., drain) transistor node coupled to the fourth transistor M2 in the trans-linear cell of the divider 42 to receive the target current $I_T$ while the second transistor M33 in the converter 44 has its respective third node coupled to a reference resistor $R_{IV}$.

As exemplified in FIG. 5, the target voltage value $V_T$ is equal to the voltage drop across the reference resistor $R_{IV}$ when target current $I_T$ flows therein via the mirror arrangement M23, M33.

It is noted that in one or more embodiments the target current $I_T$ flowing in the reference resistance $R_{IV}$ can have any slope value, in contrast with existing solutions that use current generators with programmable (slope) profile in order to generate current variations within a limited (slope) range.

As exemplified in FIG. 5, the output stage 46 comprises an operational amplifier circuit, op-amp, 460 coupled to a bias current generator $I_{TAIL}$ to receive a bias current therefrom, wherein the op-amp 460 includes: a first op-amp input node $V_T$ coupled to the driver circuitry 42, 44 to receive the target voltage (variation) $V_T$ therefrom; a second op-amp input node coupled to the output node VHT via a resistive voltage divider R1, R2, and an op-amp output node HT_CAP coupled to a control node of a transistor M44 configured to provide the drive current at the heater drive node VHT of the circuit 40; and a feedback capacitor CSR having a first capacitor end coupled to the op-amp output node HT_CAP and a second capacitor end coupled to the heater drive node VHT of the circuit 40 and to the second op-amp input node via the resistive voltage divider R1, R2.

As exemplified in FIG. 5, the SR circuit block 46 includes: a first gain stage 460, e.g., an operational amplifier 460 operating with a (e.g., programmable) bias current $I_{TAIL}$, the operational amplifier 460 having a first, e.g., inverting input node $V_T$ coupled to the current-to-voltage converter 44 to receive the target voltage level $V_T$ therefrom, the op-amp 460 having a second, e.g., non-inverting input node coupled to the heater resistance RHT to sense the output voltage VHT applied thereto, e.g., via a resistive voltage divider R1, R2, the op-amp 460 further having the output node HT_CAP coupled to the second input node and to the output node VHT of the fly-height control circuit 40 via a capacitor $C_{SR}$; and a second gain stage M44, e.g., a pMOS or a pnp transistor known per se, coupled to an output node HT_CAP of the first amplifier stage 460 and in series with the heater resistive element RHT to provide an output current $I_{HT}$ thereto. In some embodiments, operational amplifier 460 may be implemented using amplifier circuits known in the art, such as an operational transconductance amplifier circuit.

As exemplified in FIG. 5, resistive values of resistors in the feedback resistive voltage divider R1, R2 are selected to fix a ratio between the target voltage $V_T$ and the output voltage VHT, e.g., $V_T = VHT \cdot R_2/(R_1+R_2)$.

As exemplified in FIG. 5, the second gain stage M44 is coupled to the divider 42 via a further transistor M41 to provide thereto (e.g., via current mirroring) a N-th fraction of the output current $I_{HT}$ as the feedback (current) signal $I_{HT}/N$. For instance, the integer N may be selected by varying (e.g., increasing or reducing) a ratio between area footprint of the transistor M41 with respect to the other transistor M44 forming the current mirror arrangement.

As exemplified in FIG. 5, the capacitor $C_{SR}$ forms a so-called "Miller configuration" with the output node HT_CAP of the op-amp 460 and the output node VHT of the fly-height control circuit 40. In this way, for instance, the capacitor $C_{SR}$ exploits the (per se known) Miller effect of the first gain stage 460, that is an increase in equivalent input capacitance of the op-amp 460 due to amplification of the effect of capacitance $C_{SR}$ having a first capacitor end coupled to the output node HT_CAP of the op-amp 460 and a second capacitor end coupled to the output node VHT of the fly-height control circuit 40.

As exemplified in FIG. 5, the maximum current flow to charge/discharge the Miller capacitance $C_{SR}$ is equal to the tail current value $I_{TAIL}$. As a result, for instance, the slew rate of the output signal $I_{HT}$ is controlled via the tail current $I_{TAIL}$. Such a current, for instance, provides a bias of the input differential pair of the op-amp 460 (as illustrated in FIG. 5).

In one or more embodiments, a selected (intensity) value of the programmable tail current $I_{TAIL}$ (e.g., selected based on the desired slope of the target current $I_T$) determines a max intensity of a current flow through the output node of the op-amp to charge the Miller capacitance $C_{SR}$ (as illustrated in FIG. 5 by the solid arrow line near the VCC node) and discharge the Miller capacitance $C_{SR}$ (as illustrated in FIG. 5 by the dashed arrow line adjacent the capacitance $C_{SR}$).

As exemplified herein, the resistive voltage divider $R_1$, $R_2$ comprises resistive elements with an equivalent series resistance substantially greater than the resistance RHT (e.g., the latter could be within a range from tens up to hundreds of Ohms, or even more) of the resistive element RHT of the heater, e.g., $(R_1+R_2) \gg RHT$. As a result, for instance, the bias current $I_{TAIL}$ flows directly in the resistance RHT of the heater when target energy (e.g., electric power or voltage) changes significantly.

For instance, the resistive voltage divider R1, R2 has an equivalent series resistance greater than the resistance of the resistive heater element RHT.

As exemplified herein, in response to an appreciable variation (e.g., increase or decrease) of the target voltage $V_T$ (and corresponding target energy/power PHT), the current $I_{TAIL}$, flows (directly) to (or from) the resistance RHT discharging (or charging) Miller capacitor CSR; this yields a slew rate SR equal to a ratio between tail current $I_{TAIL}$ and Miller capacitance $C_{SR}$, e.g., $SR=I_{TAIL}/C_{SR}$ For instance, the output circuit is configured to control the respective slew rate of the output voltage based on a ratio of the bias current and a capacitance of the feedback capacitor.

$$P_{HT} = I_{HT} \cdot VHT = I_{DAC} \cdot I_{FIX} \cdot N \cdot R_{iv} \cdot \left(1 + \frac{R_1}{R_2}\right)$$

As exemplified in FIG. 5, for instance: output voltage VHT across the load resistance RHT has a value independent from the value of the load resistance RHT and can be expressed as $VHT=V_T*(1+R_1/R_2)$; output current $I_{HT}$ flowing in the load resistance RHT can be expressed as $I_{HT}=I\_DAC*I\_FIX*N/I_T$; reference resistance $R_{IV}$ can be expressed as $R_{IV}=V_T/I_T$, so that an output energy over time (that is, power) $P_{HT}$ dissipated into the resistive load RHT has a value independent from the value of the load resistance RHT and can be expressed as:

$$P_{HT} = I_{HT} \cdot VHT = I_{DAC} \cdot I_{FIX} \cdot N \cdot R_{iv} \cdot \left(1 + \frac{R_1}{R_2}\right)$$

In one or more embodiments, as a result, a (e.g., variating) profile of the output current $I_{HT}$ (or voltage VHT) provided by the fly-height circuitry 40 can be controlled by programming the slew-rate of the first gain stage 460 in the SR circuit block 46.

As exemplified in FIG. 5, the operational amplifier 460 preferably comprises an adjustable value of bias (or tail) current $I_{TAIL}$, e.g., programmable using few selections (plus additional selections for fine-tuning or trimming, to facilitate reaching the target intensity value, for instance).

For instance, the bias current generator $I_{TAIL}$ of the op-amp 460 is a programmable current generator.

One or more embodiments, optionally, facilitate fine-tuning of bias current $I_{TAIL}$ of the operational amplifier 460 in the first gain stage of the SR circuit block 46, e.g., to compensate process variations towards "fast" or "slow" process corners, keeping the values of slew rate within a certain design range.

Figure 6:
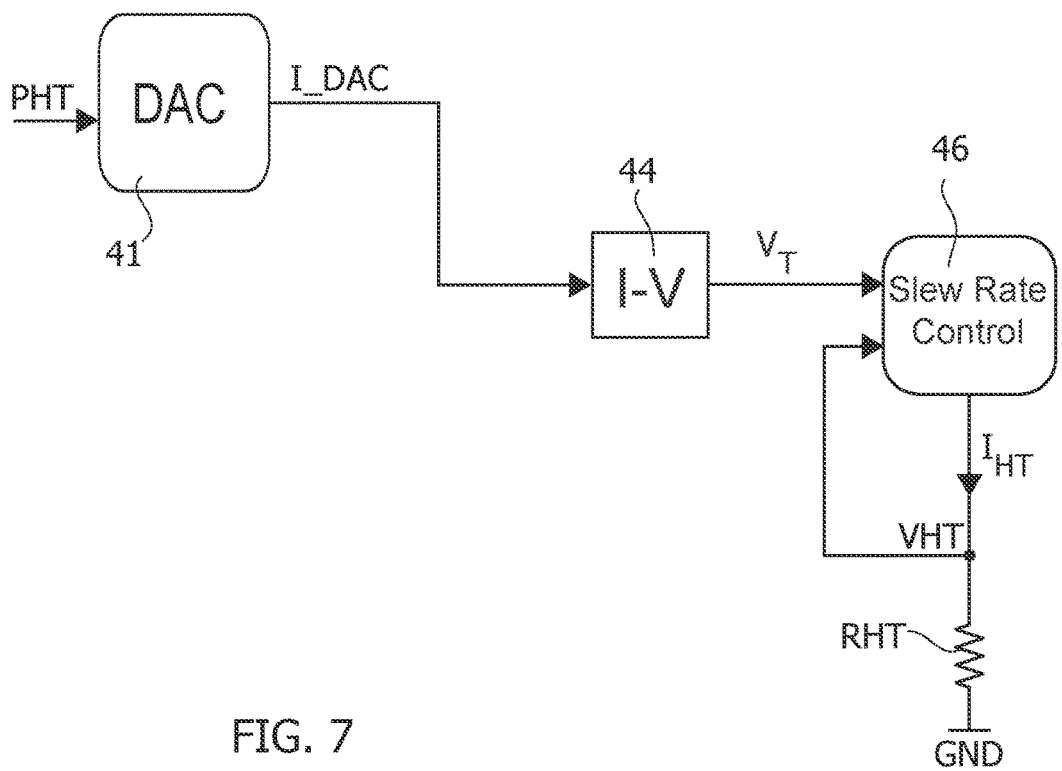
FIG. 6 is a block diagram exemplary of an alternative embodiment of a fly-height control system.

As exemplified in FIG. 6, in an alternative scenario (such as a testing application, for instance) the circuitry 40 may be used without relying on the feedback current signal $I_{HT}/N$, in a so-called "voltage mode" configured to control the voltage VHT applied to the resistive load RHT.

For instance, the target current (intensity) $I_T$ is equal to (the intensity of) the analog current I_DAC provided by the DAC 41.

As appreciable by visual comparison of the diagram exemplified in FIG. 6 with that of FIG. 4, operating the circuitry 40 in voltage mode comprises de-activating the current feedback loop from the SR circuit block 46 to the divider 42.

As exemplified in FIG. 6, when operated in "voltage mode", the DAC current intensity value I_DAC 41 is provided (directly) to the current-to-voltage converter 44, e.g., bypassing the divider 42. As a result, the target current $I_T$ has an intensity equal to the analog current intensity value I_DAC provided by the DAC circuit block 41, e.g., due to the compensation current I_FIX being turned off.

Figure 7:
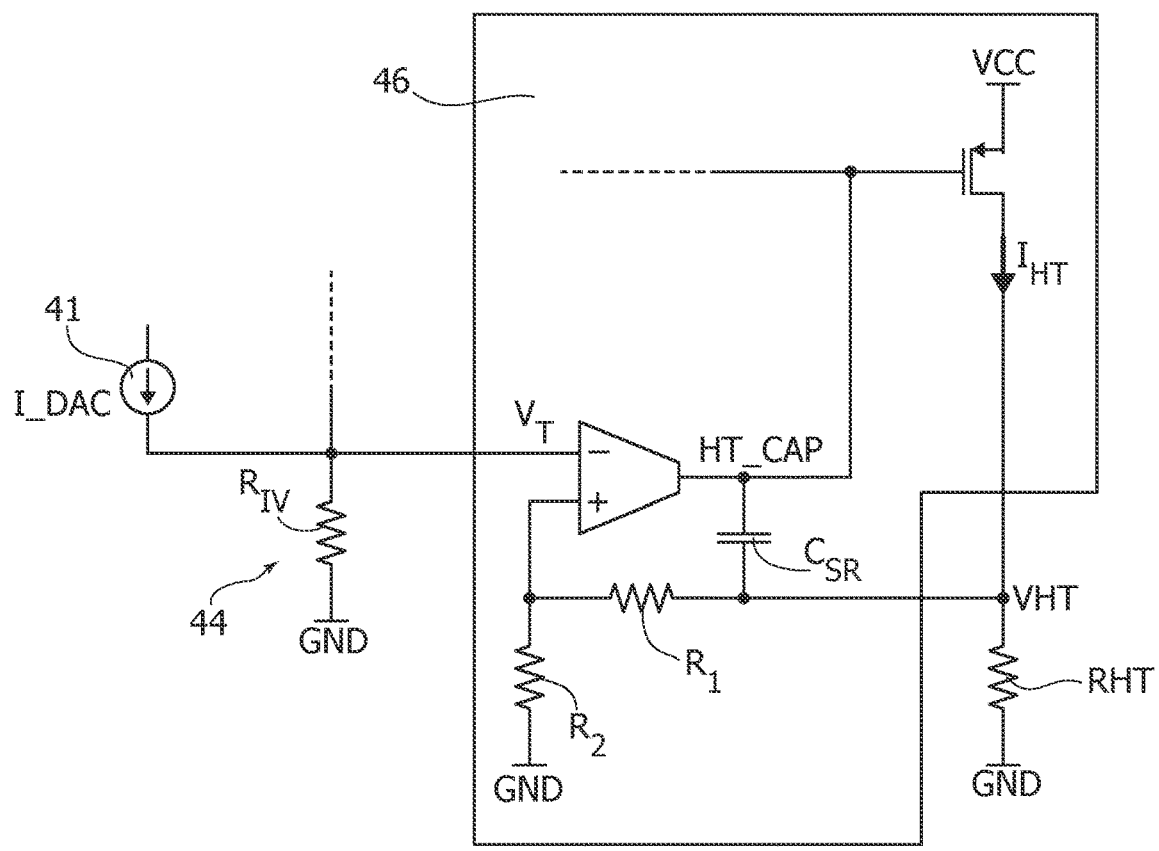
FIG. 7 is a circuit diagram exemplary of an alternative embodiment of fly-height control circuitry as per the present disclosure.

FIG. 7 is a circuit diagram exemplary of an implementation of the alternative embodiment exemplified in FIG. 6, where like references indicate like elements to those discussed in the foregoing so that a corresponding description is not repeated for the sake of brevity.

While not explicitly visible in FIG. 7, the tail current generator $I_{TAIL}$ can be present also in the SR circuit block 46 exemplified in FIG. 7, according to the same underlying principles discussed in the foregoing with reference to FIG. 5.

Figure 8A:
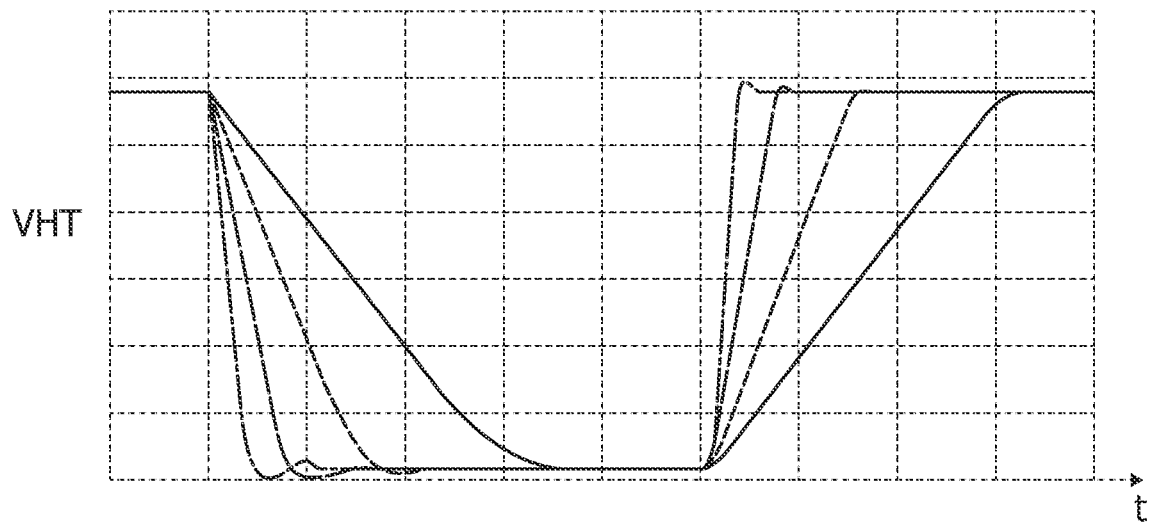
FIGS. 8A and 8B are a time diagrams exemplary of evolution over time of signals in one or more embodiments.
Figure 8B:

As exemplified in FIGS. 8A and 8B, performing fly-height control of the head 20 of the HDD 10 using a control circuit 40 as exemplified in FIGS. 4 to 7 facilitates obtaining a flat time derivative dVHT/dt signal of the output voltage VHT across the load resistance RHT for any load resistance value. For instance, each line plotted in FIGS. 8A and 8B represents the behavior of the system for a selected one of the programmable tail current values $I_{TAIL}$, corresponding to various slew-rate values.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A circuit, comprising:
    a resistive heater element configured to produce heat based on an electric energy dissipated therein;
    a heater drive node coupled to the resistive heater element to provide a drive current thereto, wherein the energy dissipated in the resistive heater element varies over time as a function of an intensity of the drive current provided to the resistive heater element;
    an input node configured to receive a digital control signal indicative of a target intensity of the drive current; and
    control circuitry coupled to the input node and to the heater drive node, the control circuitry configured to vary the intensity of the drive current of the resistive heater element based on the digital control signal, wherein the control circuitry comprises:
    a digital-to-analog converter (DAC) coupled to the input node to receive the digital control signal therefrom, the DAC configured to produce, based on the digital control signal, an analog target intensity of the drive current;
    driver circuitry coupled to the DAC and configured to produce an analog target voltage based on the analog target intensity of the drive current from the DAC; and
    an output circuit coupled to the driver circuitry to receive therefrom the analog target voltage, the output circuit configured to produce the drive current provided to the resistive heater element based on the analog target voltage, wherein the output circuit is configured to control the energy dissipated in the resistive heater element independently of a resistance value of the resistive heater element.

2. The circuit of claim 1, wherein:
    the driver circuitry is configured to provide the drive current based on the analog target voltage with a respective slew rate, and
    the output circuit is configured to control the respective slew rate of the drive current provided to the resistive heater element independently of the resistance value of the resistive heater element.

3. The circuit of claim 1 wherein the output circuit is configured to produce:
    the drive current based on the analog target voltage from the driver circuitry; and
    a feedback current signal indicative of the intensity of the drive current produced by the output circuit.

4. The circuit of claim 3, wherein the feedback current signal is a down-scaled replica of the current flowing in the resistive heater element.

5. The circuit of claim 1, wherein:
    the output circuit comprises an operational amplifier circuit (op-amp) coupled to a bias current generator to receive a bias current therefrom; and
    the op-amp comprises:
    an amplifier having a first op-amp input node coupled to the driver circuitry to receive the target voltage therefrom, a second op-amp input node coupled to an op-amp output node via a resistive voltage divider, wherein the op-amp output node is coupled to a control node of a transistor configured to provide the drive current at the heater drive node of the circuit, and
    a feedback capacitor having a first capacitor end coupled to the op-amp output node and a second capacitor end coupled to the heater drive node of the circuit and to the second op-amp input node via the resistive voltage divider.

6. The circuit of claim 5, wherein the bias current generator of the op-amp is a programmable current generator.

7. The circuit of claim 5, wherein the resistive voltage divider has an equivalent series resistance greater than the resistance of the resistive heater element.

8. The circuit of claim 5, wherein:
    the driver circuitry is configured to provide the drive current based on the analog target voltage with a respective slew rate;
    the output circuit is configured to control the respective slew rate of the drive current provided to the resistive heater element independently of the resistance value of the resistive heater element; and
    the output circuit is configured to control the respective slew rate of a voltage of the heater drive node based on a ratio of the bias current and a capacitance of the feedback capacitor.

9. The circuit of claim 1, wherein:
    the driver circuitry comprises a trans-linear circuit configured to receive the target analog intensity from the DAC and to apply a current based on the analog target intensity to a reference resistor, and
    the target analog voltage is equal to a voltage drop across the reference resistor.

10. The circuit of claim 1, wherein:
    the resistive heater element is configured to be thermally coupled to a tip of a read/write head in a memory storage device;
    the read/write head configured to have a spacing between the tip and a storage medium surface in the memory storage device;
    the spacing varies as a function of the energy dissipated in the resistive heater element; and
    the energy dissipated varies as a function of the intensity of the drive current provided to the resistive heater element.

11. A memory storage device, comprising:
    a read/write head configured to have a spacing between a tip of the read/write head and a storage medium surface in the memory storage device, and
    the circuit according to claim 1 coupled to the read/write head, the circuit configured to control energy dissipated in the resistive heater element,
    wherein the spacing varies as a function of the intensity of the drive current provided to the resistive heater element.

12. The memory storage device of claim 11, wherein the memory storage device comprises a hard-disk drive, HDD.

13. A circuit, comprising:
    an output transistor having an output node configured to be coupled to a heater resistor;

an amplifier having an output coupled to a control node of the output transistor;
a voltage divider circuit having an input coupled to the output node of the output transistor and a divided output node coupled to a first input of the amplifier;
a feedback capacitor coupled between the output of the amplifier and the output node of the output transistor, wherein a slew rate of a voltage at the output node of the output transistor is based on a bias current of the amplifier and a capacitance of the feedback capacitor.

14. The circuit of claim 13, further comprising the heater resistor.

15. The circuit of claim 13, further comprising a digital-to-analog converter (DAC) having an output coupled to a second input of the amplifier.

16. The circuit of claim 15, wherein:
the DAC comprises a current DAC; and
the circuit further comprises a resistor coupled between the second input of the amplifier and ground.

17. The circuit of claim 15, further comprising a translinear divider circuit coupled between the output of the DAC and the second input of the amplifier, the translinear divider circuit configured to provide an output proportional to an output of the DAC divided by a current flowing through the heater resistor.

18. The circuit of claim 17, further comprising:
a current to voltage converter coupled between an output of the translinear divider circuit and the second input of the amplifier; and
a feedback transistor having a control node coupled to the control node of the output transistor and an output node coupled to the translinear divider circuit.

19. A method of operating a heater resistor, the method comprising:
providing a current to the heater resistor using a circuit comprising an output transistor having an output node coupled to the heater resistor, an amplifier having an output coupled to a control node of the output transistor, a voltage divider circuit having an input coupled to the output node of the output transistor and a divided output node coupled to a first input of the amplifier, and a feedback capacitor coupled between the output of the amplifier and the output node of the output transistor;
controlling a slew rate of a voltage at the output node of the output transistor based on a bias current of the amplifier and a capacitance of the feedback capacitor.

20. The method of claim 19, further comprising controlling a distance between a read/write head of a storage device and a surface of a memory storage device via the current provided to the heater resistor.

* * * * *